(12) United States Patent
Burg

(10) Patent No.: US 6,851,741 B1
(45) Date of Patent: Feb. 8, 2005

(54) VEHICLE WITH EXTENDABLE CARGO AND/OR PASSENGER AREA

(76) Inventor: Donald E. Burg, 15840 SW. 84 Ave., Miami, FL (US) 33157

( * ) Notice: Subject to any disclaimer, the term of this patent is extended or adjusted under 35 U.S.C. 154(b) by 0 days.

(21) Appl. No.: 10/717,165

(22) Filed: Nov. 19, 2003

Related U.S. Application Data

(63) Continuation-in-part of application No. 10/673,948, filed on Sep. 29, 2003, and a continuation-in-part of application No. 10/695,541, filed on Oct. 28, 2003.

(51) Int. Cl.⁷ ............................................. B60R 27/00
(52) U.S. Cl. ................................. 296/190.11; 296/57.1
(58) Field of Search ........................ 296/100.03, 100.02, 296/57.1, 165, 175, 190.11

(56) References Cited

U.S. PATENT DOCUMENTS

| | | | |
|---|---|---|---|
| 4,068,886 A * | 1/1978 | Gostomski | 296/100.04 |
| 4,397,497 A * | 8/1983 | Alonzo et al. | 296/165 |
| 4,480,868 A * | 11/1984 | Koto | 296/190.11 |
| 4,659,136 A * | 4/1987 | Martin et al. | 296/100.04 |
| 4,784,429 A * | 11/1988 | Hodges | 296/165 |
| 4,799,726 A * | 1/1989 | Scott | 296/100.09 |
| 5,144,538 A * | 9/1992 | Harris | 362/485 |
| 5,183,307 A * | 2/1993 | Chiu, Jr. | 296/37.6 |
| 5,203,603 A * | 4/1993 | Hertzberg et al. | 296/100.03 |
| 5,516,182 A * | 5/1996 | Aragon et al. | 296/100.05 |
| 5,531,497 A * | 7/1996 | Cheng | 296/100.01 |
| 5,934,727 A * | 8/1999 | Storc et al. | 296/26.11 |
| 5,971,469 A * | 10/1999 | Lund et al. | 296/100.01 |
| 6,000,745 A * | 12/1999 | Alexa | 296/100.12 |
| 6,244,651 B1 * | 6/2001 | Hecock, Jr. | 296/100.12 |
| 6,260,916 B1 * | 7/2001 | Hunt | 296/190.11 |
| 6,513,863 B1 * | 2/2003 | Renke et al. | 296/190.11 |
| 6,588,824 B2 * | 7/2003 | Neubrand | 296/99.1 |
| 2002/0060479 A1 * | 5/2002 | Tolinski et al. | 296/216.04 |
| 2002/0079718 A1 * | 6/2002 | Neubrand | 296/99.1 |

* cited by examiner

Primary Examiner—Joseph D. Pape

(57) ABSTRACT

Presented is a retractable substantially full passenger cab height cover for vehicle rear portions that renders the vehicle's rear portion open to transport cargo when the full cab height cover is retracted and covered at a full, or nearly so, passenger cab height when the full cab height cover is extended. It has application to all manner of vehicles such as pickup trucks or sport utility vehicles (SUV's) and may be designed in and sold as original factory equipment or sold as an aftermarket product. It is possible, by use of a fold down first tailgate disposed between the passenger cab and the rear portion of the vehicle and fold down rear passenger seat elements to have a very lengthy distance, from a second tailgate at the rear of the vehicle to just behind the driver's seat, for extra passenger seating, storage of cargo, carrying of small boats, or the like. A further refinement includes a multi-system sealing system disposed between elements of the retractable cargo bed cover.

25 Claims, 6 Drawing Sheets

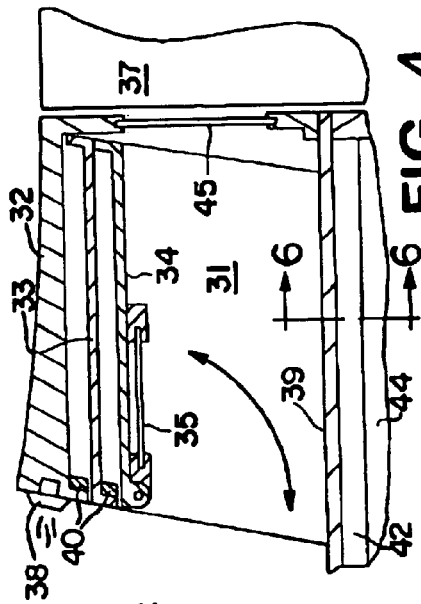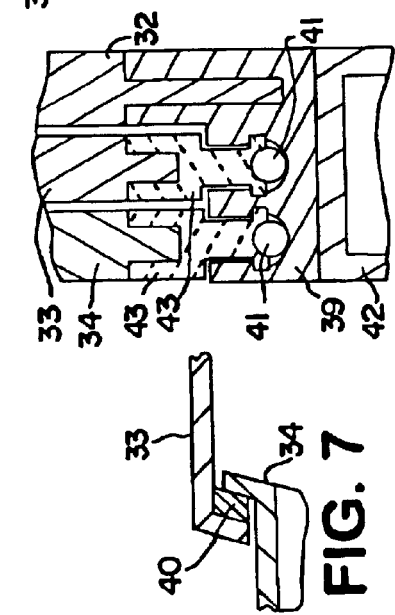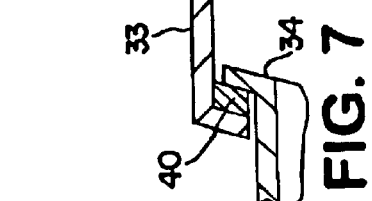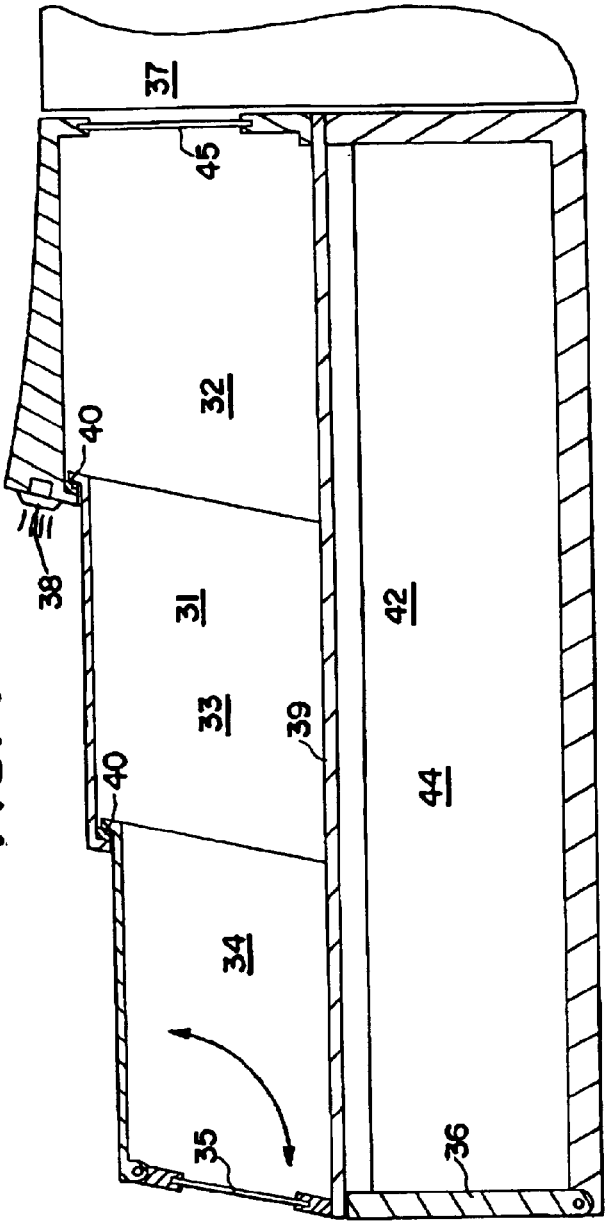

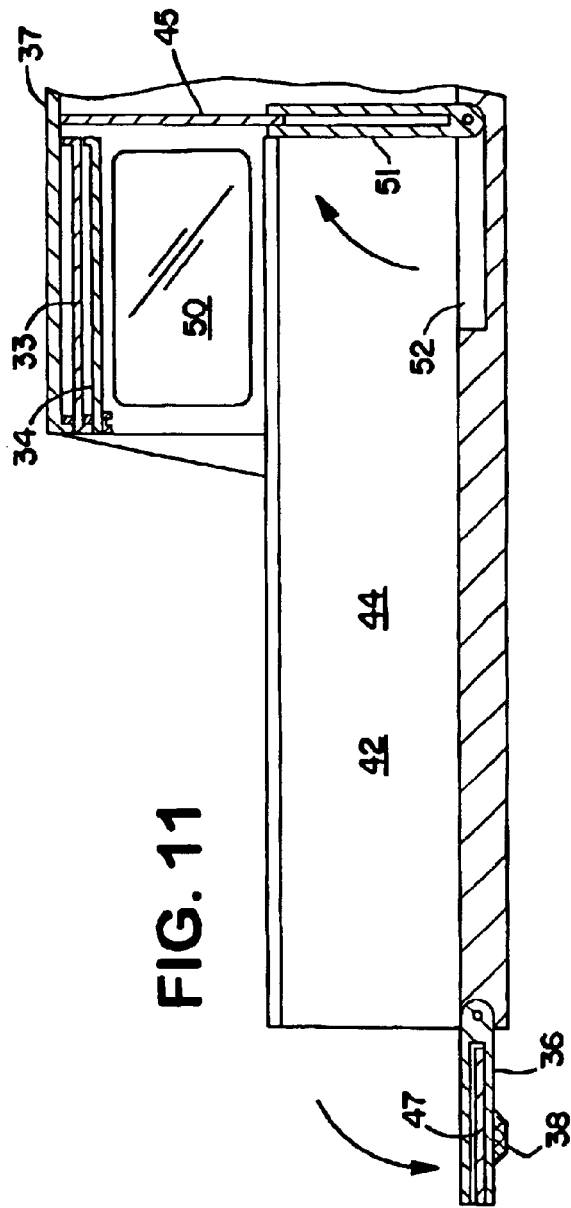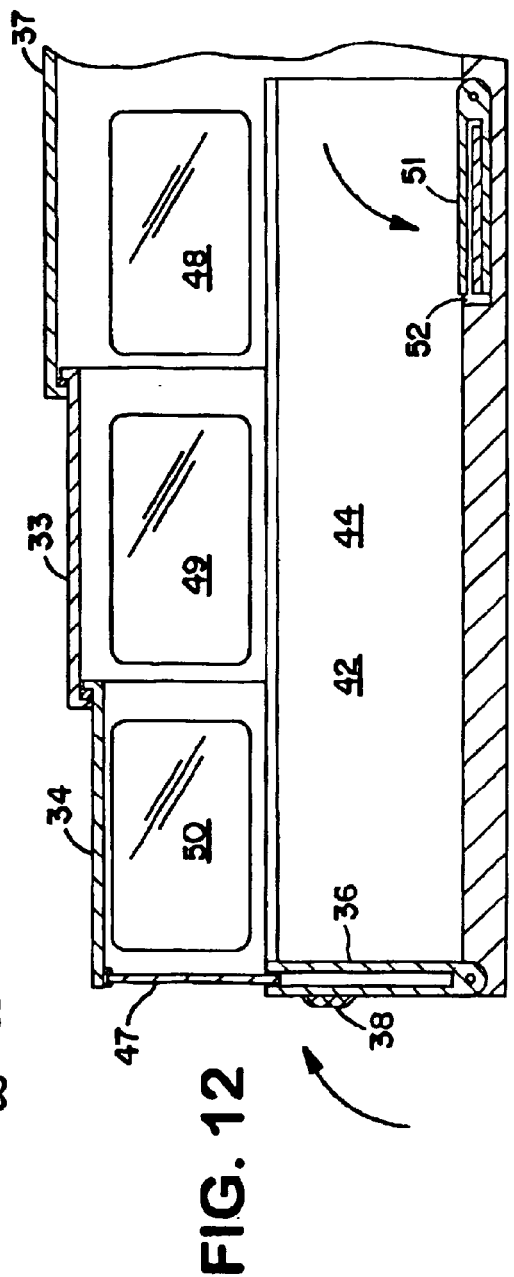

VEHICLE WITH EXTENDABLE CARGO AND/OR PASSENGER AREA

RELATED U.S. APPLICATION DATA

This application is a continuation-in-part of U.S. Ser. No. 10/673,948 filed on Sep. 29, 2003 and U.S. Ser. No. 10/695,541 filed on Oct. 28, 2003.

BACKGROUND OF THE INVENTION

The prior art offers two types of covers for vehicle cargo beds such as pickup truck cargo beds. The first type are commonly known as cargo bed or tonneau covers and fit substantially even with the top of a pickup truck's cargo bed. They come in either soft fabric, normally a coated canvas type material, or hard structure, generally a fiberglass or other rigid material. The hard structure cargo bed covers, in their most popular arrangement, tilt upward from were they are attached to the front end of the cargo bed or are made from one or more pieces and are removable for when hauling cargo that is higher than the sides of the cargo bed. Another version is made from a number of attached pieces that can be retracted into a storage compartment at the front of the cargo bed to thereby get it out of the way when hauling cargo higher than the cargo bed sides. All of these suffer a serious limitation in that they cannot be used when hauling cargo higher than the sides of the cargo bed unless they are tilted up, removed, or retracted. In all cases, hauling the higher cargo exposes such cargo to weather and wind damage.

The second type is most commonly known as the camper top or topper. These are full cab height and extend from the cab, or passenger cab as sometimes known, to the tailgate. They provide a full cab height weather proof compartment and, while removable with some effort required to unbolt and store the unit, are generally permanently installed. The most common construction for these topper units is from fiberglass so as to provide the necessary rigid structure.

There is also a full time cargo bed cover as it were on Sport Utility Vehicles (SUV's) where there is a non-retractable full height cover that extends to the rear of the vehicle. There is a tailgate or aft gate on such vehicles that opens to allow insertion or removal of cargo from the back permanently covered part of the vehicle. There is also a new SUV vehicle offered by General Motors that has a forwardly sliding top section. This latter concept still has side and frames and windows that are permanent. The only purpose is to give a vehicle that can carry high objects that are higher than the top of the vehicle. The fact that there is no access to the sides of the cargo bed is a severe handicap as cargo cannot be loaded into the cargo bed except from the aft end.

The instant invention solves the shortcomings of all of the prior art types in that it offers a full cab height waterproof unit that is retractable so that the cargo bed is open to both the top and sides, in other words fully open, over most of this length. This provides a pickup type look and easy access to the open cargo bed when retracted. When extended, it provides a full cab height waterproof enclosure over the cargo bed. The instant invention is applicable as both an aftermarket product to pickup trucks and the like and also to new pickup truck, SUV, and similar factory designs.

The instant invention also offers a unique means to extend the length of the cargo bed of a pickup truck and/or to extend the passenger compartment of a SUV. This is accomplished by having a first tailgate like member positioned forward of a cargo bed or similar vehicle bed. The first tailgate rotates downward to be out of the way when it is desired to extend the bed length. In the preferred embodiment, a seat forward of the first tailgate also rotates so that a flat floor is provided all the way forward into the passenger compartment. This provides for an extremely long and flat floor for carrying cargo and/or for extending the passenger compartment. It is important to note that this method of extending the length of the cargo bed and/or passenger compartment may be used in conjunction with the retractable cab height bed cover. It is also applicable for use with an aft bed of a vehicle, such as the cargo bed of a pickup truck, that has no bed cover or that has a fixed bed cover.

SUMMARY OF THE INVENTION

A primary object of the instant invention is to offer an improved cargo bed cover for cargo beds of vehicles where said cargo bed cover is of substantially a height of a cab of the vehicle and is disposed, at least primarily, aft of a cab of the vehicle and retractable to thereby render said cargo bed open over at least a portion of its length.

It is a related object of the invention it may be applied as an aftermarket product to pickup trucks and the like.

It is a further object of the invention that it may be integrated into the design of a vehicle initially so that it is a factory offered integral part of the vehicle.

It is a directly related object of the invention that it may be applied to new pickup trucks, Sport Utility Vehicles, or other vehicle types.

It is yet another object of the invention that it may be applied to other vehicles than land vehicles including boats.

A further object of the invention is that retraction of the cargo bed cover may render said cargo bed open over at least thirty percent of its length.

Another object of the invention is that retraction of the cargo bed cover may render said cargo bed open over at least forty percent of its length.

Still another object of the invention is that retraction of the cargo bed cover may render said cargo bed open over at least fifty percent of its length.

Yet another object of the invention is that retraction of the cargo bed cover may render said cargo bed open over at least sixty percent of its length.

Still one more object of the invention is that retraction of the cargo bed cover may render said cargo bed open over at least seventy percent of its length.

A further object of the invention is that the cargo bed cover may be comprised of two or more cargo bed cover elements.

Yet another object of the invention is that the cargo bed cover may be comprised of three cargo bed cover elements.

A further object of the invention is that said cargo bed cover may be comprised of four cargo bed cover elements.

One of the preferred embodiments of the invention is that a first cargo bed cover element of the cargo bed cover may be fixedly attached to the vehicle.

A directly related object of the invention is that said first cargo bed cover element of the cargo bed cover may be enclosed on its forward end and its sides.

A primary object of the invention is that one or more of cargo bed cover elements of the cargo bed cover may slide aft to effect a covered closure over the cargo bed.

A directly related object of the invention is that one or more of cargo bed cover elements of the cargo bed cover slide forward to effect an open aft end of the cargo bed.

A further object of the invention is that, when extended aft, said cargo bed cover is lockable to a tailgate of a pickup truck.

Yet another object of the invention is that it include a stoplight affixed proximal an aft end of a first cargo bed cover element.

A similar object of the invention is that it include a stoplight affixed proximal an aft portion of a rearmost cargo bed cover element as seen with the cargo bed cover extended rearward.

Another object of the invention is that elements of said cargo bed cover slide in tracks disposed either side of the cargo bed.

A directly related object of the invention is that the tracks include rolling elements such as ball or roller bearings.

A further directly related object of the invention is that the rolling elements maybe rolling wheels or the like.

Yet another object of the invention is that elements of said cargo bed cover may have upward turning seal portions to prevent water from entering the cargo bed when said elements are extended to cover the cargo bed.

A directly related object of the invention is that the seal portions disposed between elements of said cargo bed cover may include a seal element that may be compressed.

A further object of the invention is that there may be windows that retract into forward and/or aft tailgate members.

It yet another object of the invention that there may be side windows in one or more of the retractable bed cover elements.

It is still another object of the invention that it may include such concepts that a first or forward tailgate may fold downward to thereby give a greatly extended cargo and/or passenger area.

It is a directly related object of the invention that the forward tailgate may include a retractable window.

It is still another directly: related object of the invention that there may be a cover for the forward tailgate when it is rotated downward.

A related object of the invention is that the ability of the first or forward tailgate to fold downward may be incorporated into a pickup truck design.

It is yet another object of the invention that seating positioned forward of and proximal to the forward tailgate may fold down and out of the way for carrying long pieces of cargo and/or for extending the length of a passenger area.

It is still another object of the invention that a water leakage passageway may be incorporated into sealing means for the various elements of the sliding cargo bed cover.

Still another-object of the invention is that elements capable of extending or contracting the length and/or height of pieces of the sliding elements or the fixed forward element may be employed.

It is another object of the invention that a powered actuator may be used to extend or retract sliding elements of the cover.

BRIEF DESCRIPTION OF THE DRAWINGS

FIG. 4 presents a partial view of the instant invention as taken through a vertical centerline plane of the vehicle presented in FIG. 1. This is with the instant invention bed cover retracted forward. Note the windows in the first affixed element and the fold down portion of the aft retractable element.

FIG. 5 gives a partial-view taken through a vertical centerline plane of FIG. 3. This is with the instant invention retractable cab height bed cover extended all the way aft. Note that the rear window portion extended down and locked against a tailgate of a pickup truck in this illustration.

FIG. 6 presents a partial cross-section, as taken through line 6—6 of FIG. 4 that shows a preferred embodiment of working sections of side mounts. In this case the retractable elements are mounted on ball bearings to make movement easy. The outer element shown as fixed represents a first fixed in place element. While the first or forward element is shown as fixed in figures presented in this application it is to be realized that it may move fore and aft also if such presents a desirable option.

FIG. 7 gives an enlarged view of how the elements of the cover may seal out water from entering. In this example, there is a sealing lip on each part with a compression seal between them. Various other approaches to sealing are with the scope of the instant invention.

FIG. 11 gives a partial centerline cross-sectional view, as taken through the vertical centerline plane of FIG. 1, that has the retractable cover fully retracted. For purposes of illustration, the aft tailgate is shown down here. The forward tailgate or aft gate of the passenger or cab portion of the vehicle is shown up with its preferred internal window up to seal the passenger cab area here. Note that it is possible to have the forward tailgate down with its window retracted which gives a very long cargo bed.

FIG. 12 presents a partial centerline cross-sectional view, as taken through a vertical centerline plane of FIG. 3, that has the retractable cover fully extended. Note that the forward tailgate is down and actually part of the bed floor here. This arrangement makes for a very long passenger compartment and/or cargo bed.

FIG. 21 presents the same view as that given in FIG. 20 but in this case the sliding element sections are further apart from each other to thereby make the overall sliding element wider and/or higher the situation may call for.

DETAILED DESCRIPTION

Figure 1:
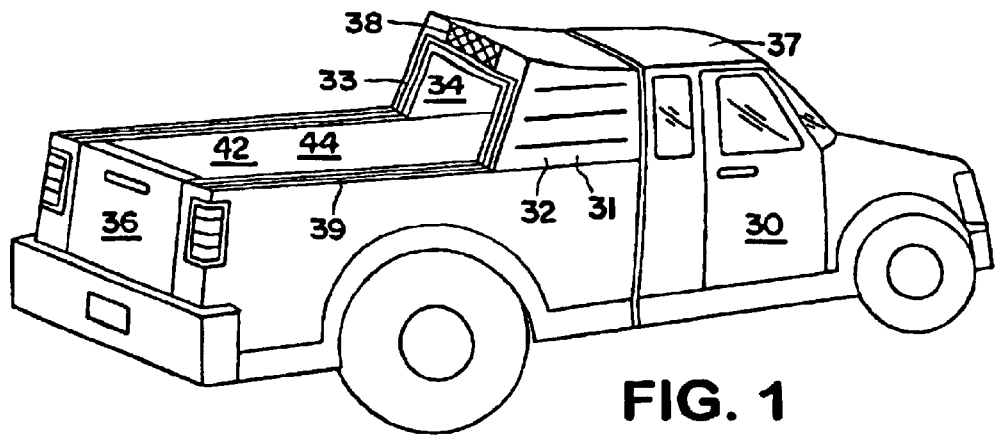
FIG. 1 presents a rear quarter perspective view of a vehicle, in this case a pickup truck, with the instant invention retractable cargo bed cover retracted in its forward position to thereby leave the aft portion of its cargo bed open. The important feature here is that the retractable cargo bed cover is at substantially the same height as the cab of the pickup truck. It is also important to note that the forward element of the retractable cover is affixed in this case. Also, that forward element may be simply a part of the cab of the vehicle which may be preferred in a new vehicle design.

FIG. 1 presents a rear quarter perspective view of a vehicle 30, in this case of a pickup truck, that shows the instant invention retractable cab height vehicle cargo bed cover 31. A forward element 32, in this example fixed in position, and retractable elements 33, 34 are shown in their retracted position to thereby give a maximum open cargo bed opening. The cargo bed 44, pickup tailgate 36, cargo bed side 42, and brake light 38 are also shown.

Figure 2:
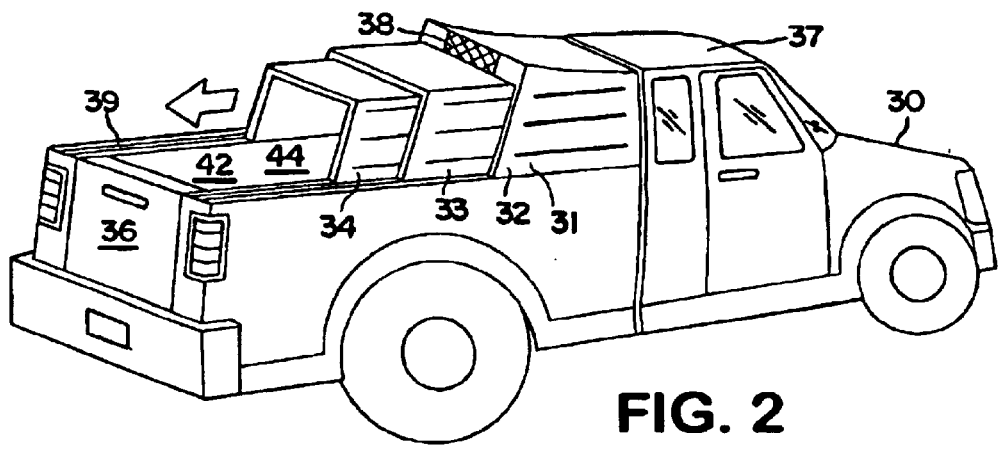
FIG. 2 is the same perspective view as presented in FIG. 1 but showing elements of the retractable-cargo bed as they are being extended aft.

FIG. 2 shows the same perspective view as does FIG. 1 but with retractable elements 33, 34 shown as they are being moved aft.

Figure 3:
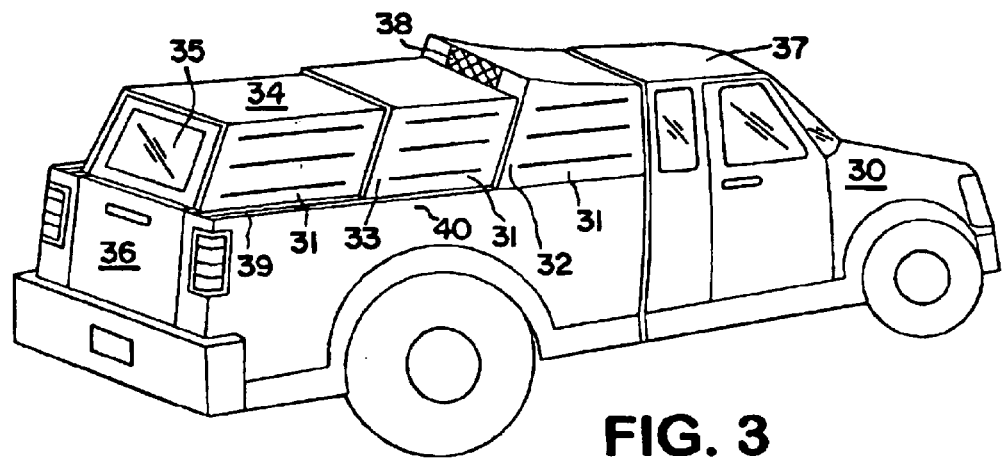
FIG. 3 presents a perspective view as FIGS. 1 and 2 but with the retractable cover elements extended aft so that they enclose the entire bed of the pickup truck here. Note that the brake light, while shown mounted on the forward affixed element here, may be affixed to the aft retractable element. This latter approach gives best view of the stop light when the retractable bed cover is extended aft.

FIG. 3 presents the same view as does FIGS. 1 and 2 but with the retractable bed cover elements 33, 34 extended all way aft to thereby cover the entire cargo bed. Note the rear window element 36 that is folded down and locked to the tailgate 36 in this case.

FIG. 4 presents a partial cross sectional view, as taken through a vertical centerline plane of the vehicle 30 given in FIG. 1, that shows positioning of the various elements when the instant invention retractable cab height bed cover 31 is retracted forward. Note that the rear hinged portion 35 is retracted upward here so that full size and height items may be placed all the way to the aft end of the cargo bed 44. Note also the rear window 45 that allows full view aft by a driver of the vehicle.

FIG. 5 shows a partial cross sectional view, as taken through a vertical centerline plane of the vehicle 30 that is shown in FIG. 3. This shows all of the retractable bed cover elements 33, 34 extended all the way aft to thereby cover the full cargo bed 44. Other items shown include side mounts 39 that are mounted on cargo bed sides 42, and compression seal elements 40.

FIG. 6 presents a partial cross sectional view, as taken through line 6—6 of FIG. 4, that shows a preferred embodiment slide mount 39 that includes rolling elements 41, and bed cover retractable element mount adapters 43. Note that other means of reducing friction than the ball bearings shown may be used. Also, roller bearing elements may be used to replace the ball bearings 40.

FIG. 7 is an enlarged view that shows how a typical means of sealing between retractable bed cover elements may be accomplished. Note the downward extending lip on element 33 and the upward extending lip on the more rearward element 34. A compression seal 40 such as might be made from sponge rubber is shown.

From a construction standpoint, the retractable bed cover elements 33, 34 would best be constructed using a composite construction. As an example, while not shown, this might utilize a fiberglass or other composite outer layer, a foam core, and a fiberglass or other composite inner layer. Other materials such as structural foam, while very expensive from a tooling standpoint, may also be utilized.

Figure 8:
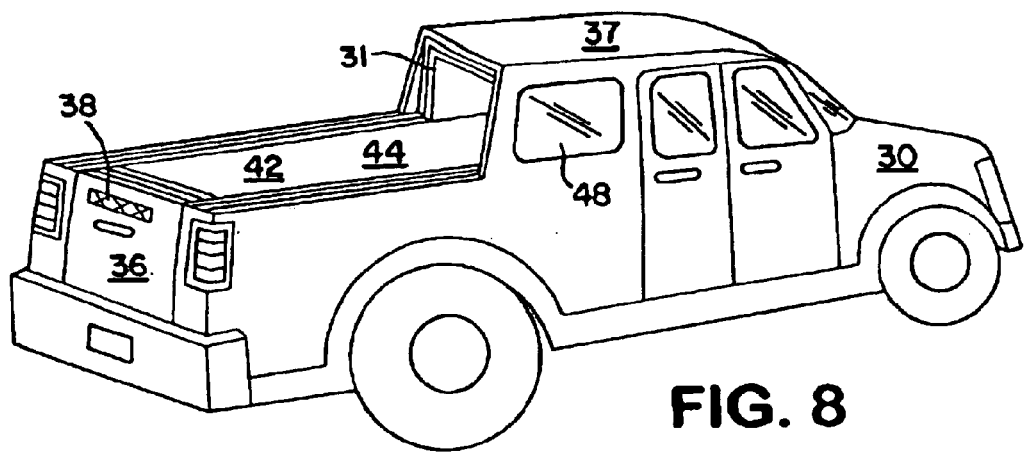
FIG. 8 presents a vehicle, such as a Sport Utility Vehicle (SUV) and pickup truck, that has the instant invention retractable full height cover built into the original design. In this case the full height cover is retracted. It is to be noted that the instant invention retractable cover does not have to be full cab height; however, the full cab height is certainly the preferred embodiment of the invention.

FIG. 8 presents a slight variation of the instant invention whereby it is built into a vehicle 30 as it comes from the factory. The full height cover 31 is retracted to provide a fully open bed 44 here. In this case there is an aft tailgate 36 that preferably includes a stoplight 38. The instant invention retractable full height cover 31 is included as an open part of the vehicle's cab or passenger compartment 37.

Figure 9:
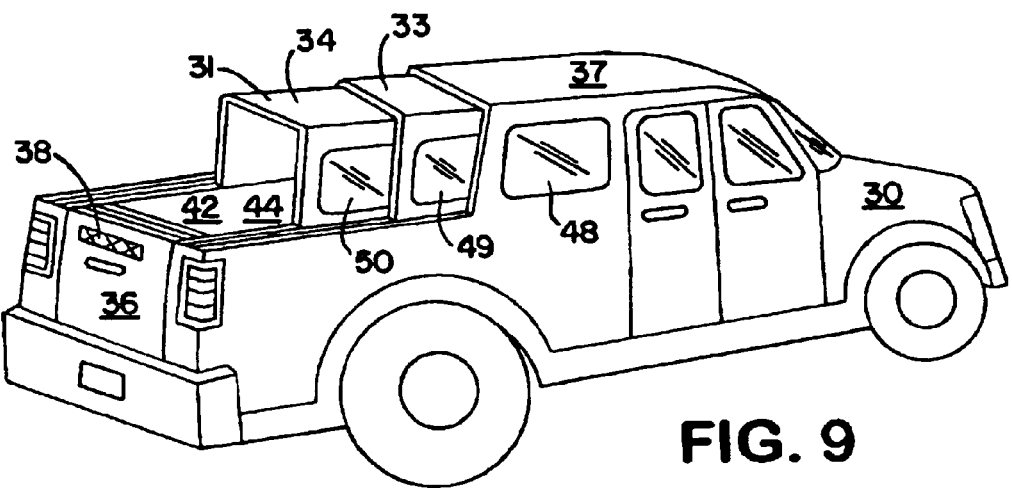
FIG. 9 presents the same vehicle as that presented in FIG. 8 but in this case the instant invention retractable cover is partially extended over the back end of the vehicle.

FIG. 9 shows the same vehicle 30 as presented in FIG. 8 but in this case the retractable covers 33, 34 are being extended aft.

Figure 10:
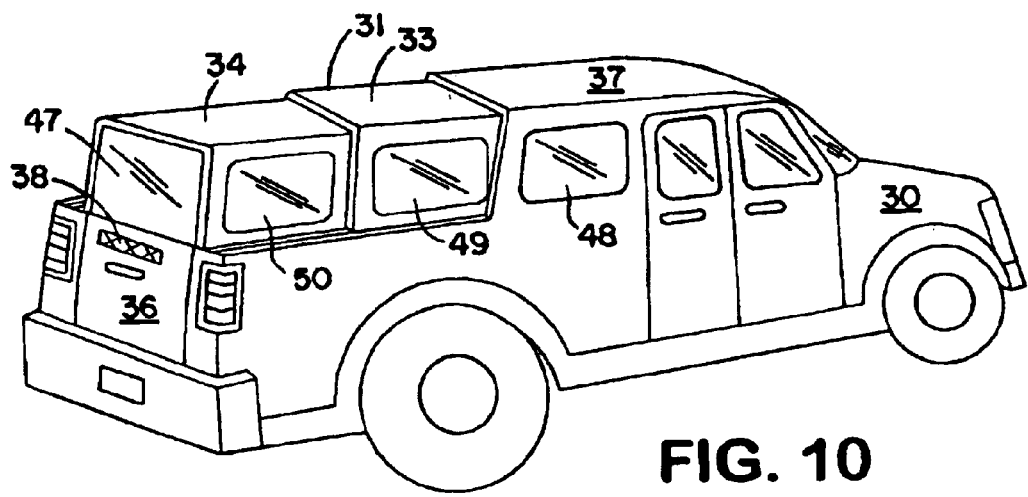
FIG. 10 shows the vehicle with the retractable cover fully extended. Note the optional side windows here that makes for a vehicle that can have seating or other passenger accommodations in the area under the extended retractable cover.

FIG. 10 presents the same vehicle 30 as given in FIGS. 8 and 9 but with the retractable elements 33, 34 extended fully aft. Note that a rear window 47 moves up from inside the aft tailgate 36 here. Having the rear window 47 retract into and extend upward from the aft tailgate 36 is a preferred embodiment of the instant invention as that precludes having to have a fold up window as used in the examples of FIGS. 4 and 5. Further, an alternative embodiment of the instant invention has windows 49, 50 in moveable elements 33, 34 and window 48 that basically lines up with windows 49, 50 when elements 33, 34 are retracted.

FIG. 10 presents a partial centerline cross-sectional view, as taken through the vertical centerline plane of FIG. 8, that shows retractable elements 33, 34 in their retracted positions. Note the forward tailgate or door 51 that is up in this case with its preferred window 45 up so that the cab or passenger area 37 is sealed at its aft end. In this case, for purposes of illustration, the aft tailgate 36 is open with its window 47 withdrawn. Note that a stoplight 38 is attached to the aft tailgate 36 in this preferred embodiment showing its location.

FIG. 11 is a partial centerline cross-sectional view, as taken through the vertical centerline plane of FIG. 10, that shows retractable elements 33, 34 extended. The aft tailgate 36 is up and its window 47 is extended here. Also the forward tailgate 51 is down and rotated aft here to make for a very long and useful cargo and/or passenger area. Note that the forward tailgate 51 is, when rotated forward, down inside of a tailgate recess 52 which offers a preferred variation to the instant invention. The advantage of having this tailgate recess 52 is that a flat floor all the way to the back of the driver's seat is possible.

FIG. 12 presents a partial centerline cross-sectional view, as taken through a vertical centerline plane of FIG. 3, that has the retractable cover slideable elements 33, 34 fully extended. Note that the forward tailgate 51 is down and actually part of a cargo bed floor since it has been placed in the forward tailgate recess 52 here. This arrangement makes for a very long passenger compartment and/or cargo bed. This concept may also be used in vehicles that do not have the retractable cover invention.

Figure 13:
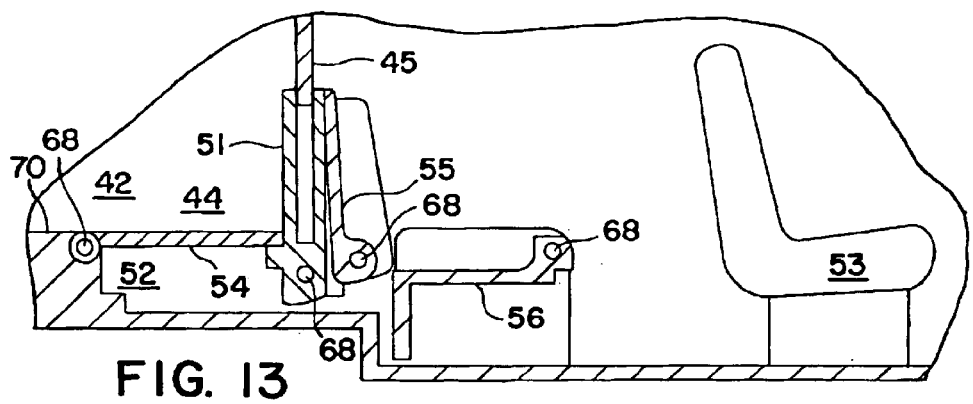
FIG. 13 gives a partial cross-sectional view of a vehicle with a forward tailgate and passenger seating just forward of the tailgate.

FIG. 13 gives a partial cross-sectional view of a vehicle with a forward tailgate 51 with a retractable window 45, tailgate bed cover 54, back seat back 55, back seat bottom 56, and forward seat 53. In this case, all seats 55, 56, 53 and the first or forward tailgate 51 are in their normal positions providing full passenger seating Normal pivots 68 for many of these items are also shown.

Figure 14:
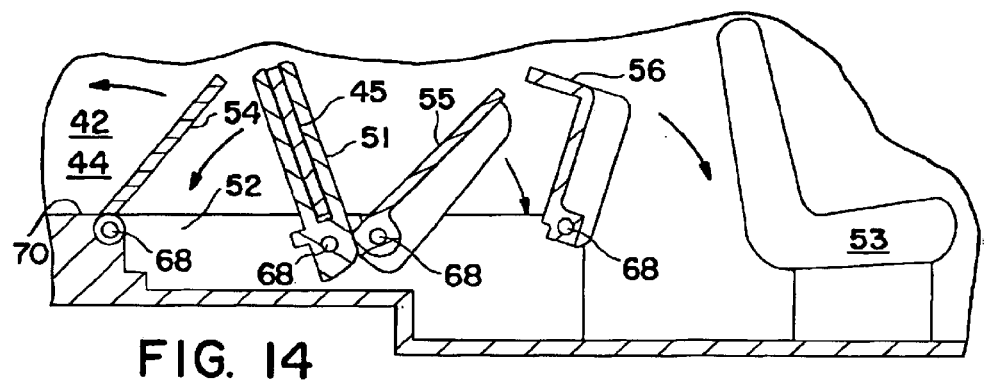
FIG. 14 is the same partial cross-sectional view as given in FIG. 13 but in this case the forward tailgate has its window retracted and being rotated downward. The passenger seating is also being rotated out of the way.

FIG. 14 is the same partial cross-sectional view as given in FIG. 13 but in this case the forward tailgate 51 has its window 45 retracted and being rotated downward. The rear seat back 55 and rear seat bottom 56 are also being rotated out of the way in this illustration. Other means of movement of these seat portions may be utilized of course.

Figure 15:
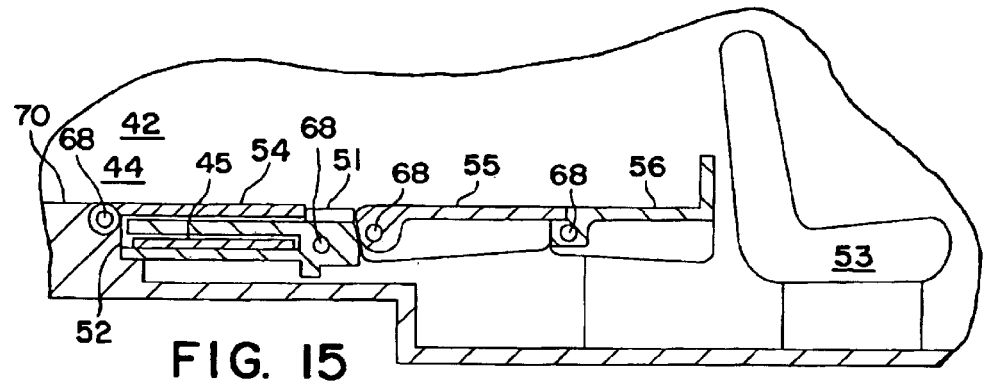
FIG. 15 presents the same partial cross-sectional view as does FIGS. 13 and 14 but with the forward tailgate and elements of the passenger seating rotated downward and out of the way. This makes for a long extended cargo bed and/or passenger compartment. Note that this concept may be applied to vehicles that do not have the retractable cab height cargo bed that is a subject of this invention if desired.

FIG. 15 presents the same partial cross-sectional view as FIGS. 13 and 14 but with the forward tailgate 51 and elements of the rear seat back 55 and rear seat bottom 56 downward and out of the way. The rear seat bottom 56 preferably has a lip on its forward end to prevent cargo from sliding forward. This arrangement makes for an extremely longs extended cargo bed and/or passenger compartment. A portion of a floor 70 of these compartments is shown. Note that this concept may also be applied to vehicles that do not have the retractable cab height bed cover that is a subject of this invention.

Figure 16:
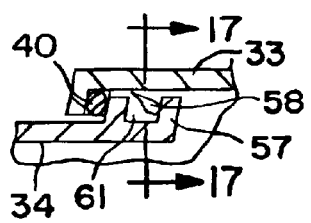
FIG. 16 presents an improvement to the seal design given in FIG. 7. In the improved FIG. 16 case, there is a backup seal channel that captures and water leakage that may pass the compressible elastomeric seal.

FIG. 16 presents an improvement to the seal design given in FIG. 7. In the improved FIG. 16 case, there is a backup seal channel 61 that captures any water leakage, illustrated here by water drops 58, that may pass the compressible elastomeric seal 40. The seal lip 57 aids in retaining any water leakage from the leakage flow channel 61 and in actually defining the water flow channel 61.

Figure 17:
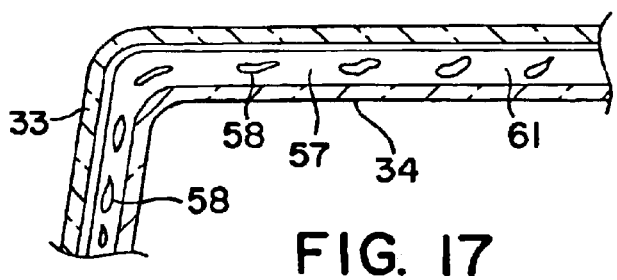
FIG. 17 presents a partial cross-sectional view, as taken through vertical transverse plane 17—17 of FIG. 16, that shows how water leakage would be directed out to the sides and downward of one of the sliding elements.

FIG. 17 presents a partial cross-sectional view, as taken through vertical transverse plane 17—17 of FIG. 16, that shows how water leakage, such as shown by water drops 58, would be directed out to the sides and downward of one of the sliding elements. In this case, the lower sliding element is the second sliding element 33.

Figure 18:
FIG. 18 presents a partial cross-sectional view, as taken through a vertical transverse plane of a sliding element, that shows a method of joining two portions of a sliding element.

FIG. 18 presents a partial cross-sectional view, as taken through a vertical transverse plane of the second sliding element 33, that shows a spacer 60 used to join two portions of the second sliding element 33.

Figure 19:
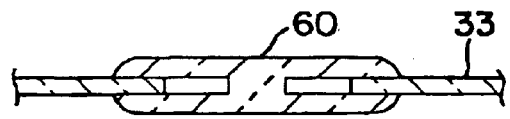
FIG. 19 presents the same view as that given in FIG. 18 but in this example the sliding element sections are further apart from each other to thereby make the overall sliding element wider as the case may be. Note that such a concept may also be applied to vertically oriented sections of the sliding elements.

FIG. 19 presents the same view as that given in FIG. 18 but in this example the second sliding element 33 sections are further apart from each other to thereby make the overall sliding element wider. Note that such a concept may also be applied to vertically oriented sections of sliding elements.

Figure 20:
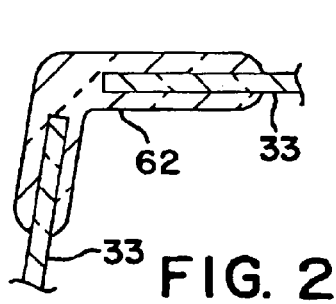
FIG. 20 gives a partial cross-sectional view, as taken through a vertical transverse plane of a sliding element, that shows a method of doing a corner fabrication of the sliding element.

FIG. 20 gives a partial cross-sectional view, as taken through a vertical transverse plane of the second sliding element 33, that shows a method of doing a corner fabrication of the sliding element. This is accomplished using corner spacer 62.

Figure 21:
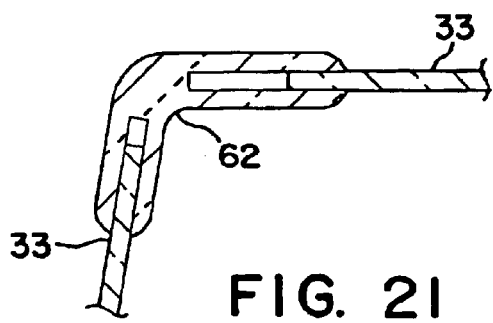

FIG. 21 presents the same view as that given in FIG. 20 but in this case the second sliding element 33 sections are further apart from each other to thereby make a sliding element wider and/or higher as the situation may call for.

Figure 22:
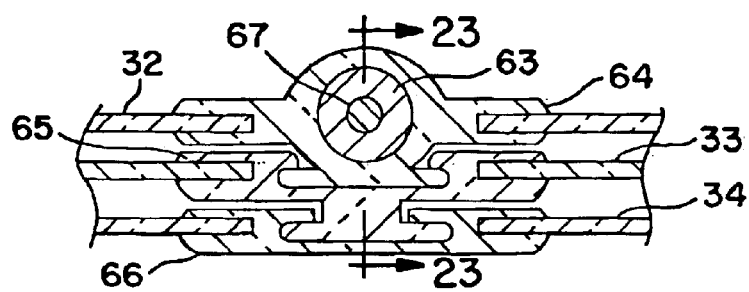
FIG. 22 presents a partial cross-sectional view, as taken in a vertical plane that includes several sliding elements, that shows a insert elements that add support to each other to thereby aid in preventing sagging of the elements. In this example, an optional motorized system is offered that would extend or retract the sliding elements.

FIG. 22 presents a partial cross-sectional view as taken in a vertical plane that includes several sliding elements, that shows insert elements 64, 65, 66 that add support to each other to thereby aid in preventing sagging of the sliding elements 33, 34. In this example, an optional motorized system is offered that would extend or retract the sliding elements 33, 34.

Figure 23:
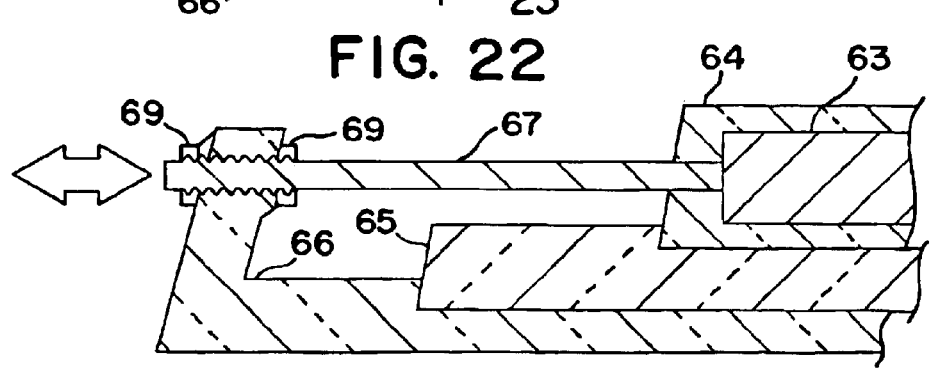
FIG. 23 gives a partial cross-sectional view, as taken through vertical plane 23—23 of FIG. 22, that shows one method of using a powered motor, such as an electric linear actuator motor, to extend or retract the sliding elements.

FIG. 23, gives a partial cross-sectional view, as taken through vertical plane 23—23 of FIG. 22, that shows one method of using a motorized actuator 63, such as an electric linear actuator motor, to extend or retract the sliding elements. The motor shaft 67 and attachment fasteners 69 are also shown.

While the invention has been described in connection with a preferred and several alternative embodiments, it will be understood that there is no intention to thereby limit the invention. On the contrary, thee is intended to be covered all alternatives, modifications, and equivalents as may be included within the spirit and scope of the invention as defined by the appended claims, which are the sole definition of the invention.

What I claim is:

1. In an improved vehicle with a passenger compartment forward and an open rear portion, the improvement comprising:

a first tailgate disposed proximal an enclosed rear portion of said passenger compartment and, at least in its majority and when in a vertical orientation, forward of the open rear portion of the improved vehicle, and said first tailgate may be opened to a horizontal orientation and disposed, at least in its majority, internal to a first tailgate recess in a floor of the open rear portion and wherein said first tailgate has a retractable window wherein said retractable window is retractable into said first tailgate.

2. The improved vehicle of claim 1 which further comprises a passenger compartment rear seat disposed, at least in its majority, proximal to and forward of a forward portion of said first tailgate when said first tailgate is in its vertical orientation, wherein said rear passenger seat, when used for passenger seating, is composed of vertically and horizontally oriented seating elements, wherein support portions of said vertically and horizontally oriented seating elements are disposed distal from their passenger seating surfaces and are composed, at least primarily, of rigid materials, and wherein said rear passenger seat elements may be reoriented such that their support portions are upward to thereby form portions of a horizontal floor that extends rearward to proximal a second tailgate disposed proximal a rear end of the open rear portion of the vehicle.

3. The improved vehicle of claim 2 wherein said horizontally oriented seating element support portion has a lip on its support portion such that said lip acts to prevent cargo from sliding forward when the support portion is acting as a floor extension.

4. The improved vehicle of claim 2 wherein said vertically and horizontally oriented seating elements rotate about pivots.

5. The improved vehicle of claim 1 which further comprises a first tailgate cover that serves as a cover for the first tailgate recess when the first tailgate is in its vertical orientation.

6. The improved vehicle of claim 1 which further comprises a first tailgate cover that covers the first tailgate when it is in its horizontal orientation.

7. The improved vehicle of claim 1 which further comprises a multi-element retractable cover, a height of said multi-element retractable cover proximal a height of the passenger compartment and capable of covering a open rear portion of the improved vehicle.

8. The improved vehicle of claim 1 which further comprises a second tailgate disposed proximal an aft end of the open rear portion of the improved vehicle.

9. The improved vehicle of claim 1 wherein said second tailgate includes a retractable window.

10. In an improved vehicle with a forward passenger compartment and a cargo area disposed rearward of the forward passenger area, the improvement comprising:

a first tailgate disposed between the passenger compartment and the cargo area, said first tailgate rotatable rearward and downward into a first tailgate recess in a cargo area floor, passenger seating proximal to and forward of the first tailgate, said passenger seating composed of a rear vertical member capable of rotating forward to form an extension to the cargo area floor and a forward horizontal member capable of rotating forward to form an extension to the cargo area floor.

11. The improved vehicle of claim 10 wherein said first tailgate includes a retractable window.

12. The improved vehicle of claim 10 which further comprises a rotatable cover capable of covering the first tailgate recess in the cargo area floor.

13. The improved vehicle of claim 10 which further comprises a second tailgate disposed proximal an aft end of the cargo area.

14. The improved vehicle of claim 13 wherein said second tailgate includes a retractable window.

15. The improved vehicle of claim 10 which further comprises a retractable cover that, when extended rearward, covers the cargo area and wherein a height of said retractable cover is proximal a height of the passenger compartment.

16. The improved vehicle of claim 10 wherein said passenger seat is composed of vertically and horizontally oriented seating elements, wherein support portions of said vertically and horizontally oriented seating elements are disposed distal from their passenger seating surfaces and are composed, at least primarily, of rigid materials.

17. The improved vehicle of claim 10 wherein said forward horizontal member has a lip on its support portion such that said lip acts to prevent cargo from sliding forward when the support portion is acting as a floor extension.

18. In an improved vehicle with a passenger compartment forward and an open rear portion, the improvement comprising:

a first tailgate disposed proximal an enclosed rear portion of said passenger compartment and, at least in its majority and when in a vertical orientation, forward of the open rear portion of the improved vehicle, and said first tailgate may be opened to a horizontal orientation and disposed, at least in its majority, internal to a first tailgate recess in a floor of the open rear portion and which further comprises a first tailgate cover that serves as a cover for the first tailgate recess when the first tailgate is in its vertical orientation and as a cover for the first tailgate when said first tailgate is in its horizontal orientation.

19. The improved vehicle of claim 18 wherein said first tailgate has a retractable window wherein said retractable window is retractable into said first tailgate.

20. The improved vehicle of claim 18 which further comprises a second tailgate disposed proximal an aft end of the open rear portion of the improved vehicle.

21. The improved vehicle of claim 20 wherein said second tailgate includes a retractable window.

22. The improved vehicle of claim 18 which further comprises a multi-element retractable cover, a height of said multi-element retractable cover proximal a height of the passenger compartment and capable of covering the open rear portion of the improved vehicle.

23. The improved vehicle of claim 18 which further comprises a passenger compartment rear seat disposed, at least in its majority, proximal to and forward of a forward portion of said first tailgate when said first tailgate is in its vertical orientation, wherein said rear passenger seat, when used for passenger seating, is composed of vertically and horizontally oriented seating elements, wherein support portions of said vertically and horizontally oriented seating elements are disposed distal from their passenger seating surfaces and are composed, at least primarily, of rigid materials, and wherein said rear passenger seat elements may be reoriented such that their support portions are upward to thereby form portions of a horizontal floor that extends rearward to proximal a second tailgate disposed proximal a rear end of the open rear portion of the vehicle.

24. The improved vehicle of claim 23 wherein said horizontally oriented seating element support portion has a lip on its support portion such that said lip acts to prevent cargo from sliding forward when the support portion is acting as a floor extension.

25. The improved vehicle of claim 23 wherein said vertically and horizontally oriented seating elements rotate about pivots.

* * * * *